(12) United States Patent
Connelly et al.

(10) Patent No.: US 6,869,191 B2
(45) Date of Patent: Mar. 22, 2005

(54) METHOD AND APPARATUS FOR SELECTIVELY POSITIONING DUAL PROJECTORS

(75) Inventors: William G. Connelly, Vista, CA (US); David L. Kung, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/424,359

(22) Filed: Apr. 28, 2003

(65) Prior Publication Data

US 2003/0202156 A1 Oct. 30, 2003

Related U.S. Application Data

(60) Provisional application No. 60/376,085, filed on Apr. 29, 2002.

(51) Int. Cl.[7] .................. G03B 21/26; G03B 21/14; G03B 21/22; G03B 21/32
(52) U.S. Cl. .................. 353/94; 353/119; 353/48; 352/133
(58) Field of Search .................. 353/94, 119, 48, 353/49, 51, 121, 122, 34; 352/133–135, 243; 348/825, 827, 840; 359/477; 294/139; 224/191, 242, 908; 242/197; 248/646, 647, 658, 660–662, 671

(56) References Cited

U.S. PATENT DOCUMENTS

| | | | | |
|---|---|---|---|---|
| 1,487,473 A | * | 3/1924 | Reaves | 359/471 |
| 2,200,594 A | * | 5/1940 | Diggins et al. | 355/46 |
| 2,345,911 A | * | 4/1944 | Adorno | 248/653 |
| 2,555,106 A | * | 5/1951 | Beazley | 359/470 |
| 3,912,385 A | * | 10/1975 | Stokes et al. | 353/94 |
| 4,838,515 A | * | 6/1989 | Prentice | 248/661 |
| 5,207,115 A | * | 5/1993 | Takei | 74/479.01 |

* cited by examiner

*Primary Examiner*—Russell Adams
*Assistant Examiner*—Andrew Server
(74) *Attorney, Agent, or Firm*—Gates & Cooper LLP

(57) ABSTRACT

An apparatus for selectively positioning a first projector and a second projector to project an image through a single projection aperture. The apparatus comprises a first rail system, extending longitudinally along a second axis substantially perpendicular to the first axis; a first platform, translationally slidable in the second axis on at least a portion of the first rail system; a second rail system, disposed on the first platform; a second platform, adapted for mounting the first projector and translationally slidable along the first axis on the second rail system; and a third platform, adapted for mounting the second projector and translationally slidable in the second axis on at least a portion of the first rail system.

14 Claims, 5 Drawing Sheets

METHOD AND APPARATUS FOR SELECTIVELY POSITIONING DUAL PROJECTORS

CROSS-REFERENCE TO RELATED APPLICATIONS

This application claims benefit of U.S. Provisional Patent Application No. 60/376,085, entitled "METHOD AND APPARATUS TO INSTALL DIGITAL CINEMA PROJECTORS PROVIDING DUAL USE OF OPTICS AND SPACE," by William G. Connelly and David Kung, filed Apr. 29, 2002, which application is hereby incorporated by reference herein.

This application is related to the following co-pending and commonly assigned patent application(s), all of which applications are incorporated by reference herein:

U.S. Provisional Application Ser. No. 60/376,105, entitled "SECURE DATA CONTENT DELIVERY SYSTEM FOR MULTIMEDIA APPLICATIONS UTILIZING BANDWIDTH EFFICIENT MODULATION", by Charles F. Stirling, Bernard M. Gudaitis, William G. Connelly, and Catherine C. Girardey, filed Apr. 29, 2002; and U.S. Provisional Application Ser. No. 60/376,244, entitled "METHOD TO SECURELY DISTRIBUTE LARGE DIGITAL VIDEO/DATA FILES WITH OPTIMUM SECURITY," by Ismael Rodriguez and James C. Campanella, filed Apr. 29, 2002.

BACKGROUND OF THE INVENTION

1. Field of the Invention

The present invention relates to systems and methods for orienting projectors in display theaters, and in particular to a system and method for selectively positioning a first projector and a second projector to protect an image through a single projection aperture.

2. Description of the Related Art

Cinema projection systems typically consist of a film projector and a film-handling device to allow film from a film reel to be projected through a port, or projection aperture, in the wall of the projection booth, and onto a viewing screen in a theater auditorium. The introduction of digital projectors, such as those used in the BOEING DIGITAL CINEMA system, may require installation of a second, digital projection system into the projection booth. Since content still exists in celluloid film format as well as digital format, two systems are required to offer all desired content. In many cases, the addition of a second system is complicated or prohibited by lack of space or poor optical alignment to the viewing screen.

In cases where a second film projector is installed, the second film projector can be replaced by a digital projector, but film projector redundancy is lost. If space is available, a new projection aperture can be created in the wall to allow a digital projector to project images onto the theater viewing screen. Many raised booth floors require additional reinforcements to sport the weight and stabilize the new projector. If the new port is off-axis with the screen centerline, image distortion (such as "keystone" distortion) and focusing problems can occur. In many cases, due to room constraints or screen viewing angle, an additional projector system cannot be economically installed, preventing the ability to offer digital and film content on the same screen.

What is needed is a system and method for selectively positioning different projectors to project an image through a single projection aperture. What is also needed is a system and method that is usable with current designs, without additional reinforcements for projector stabilization. What is further needed is a system and method which permits installation of two large projectors in what is many times, a small projection room. The present invention satisfies that need.

SUMMARY OF THE INVENTION

To address the requirements described above, the present invention discloses a method and apparatus for selectively positioning a first projector and a second projector to project an image through a single coaxial projection aperture. The apparatus comprises a first rail system, extending longitudinally along a second axis substantially perpendicular to the first axis; a first platform, translationally slidable along the second axis on at least a portion of the first rail system; a second rail system, disposed on the first platform, a second platform, adapted for mounting the first projector and translationally slidable along the first axis on the second rail system; and a third platform, adapted for mounting the second projector and translationally slidable along the second axis on at least a portion of the first rail system.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
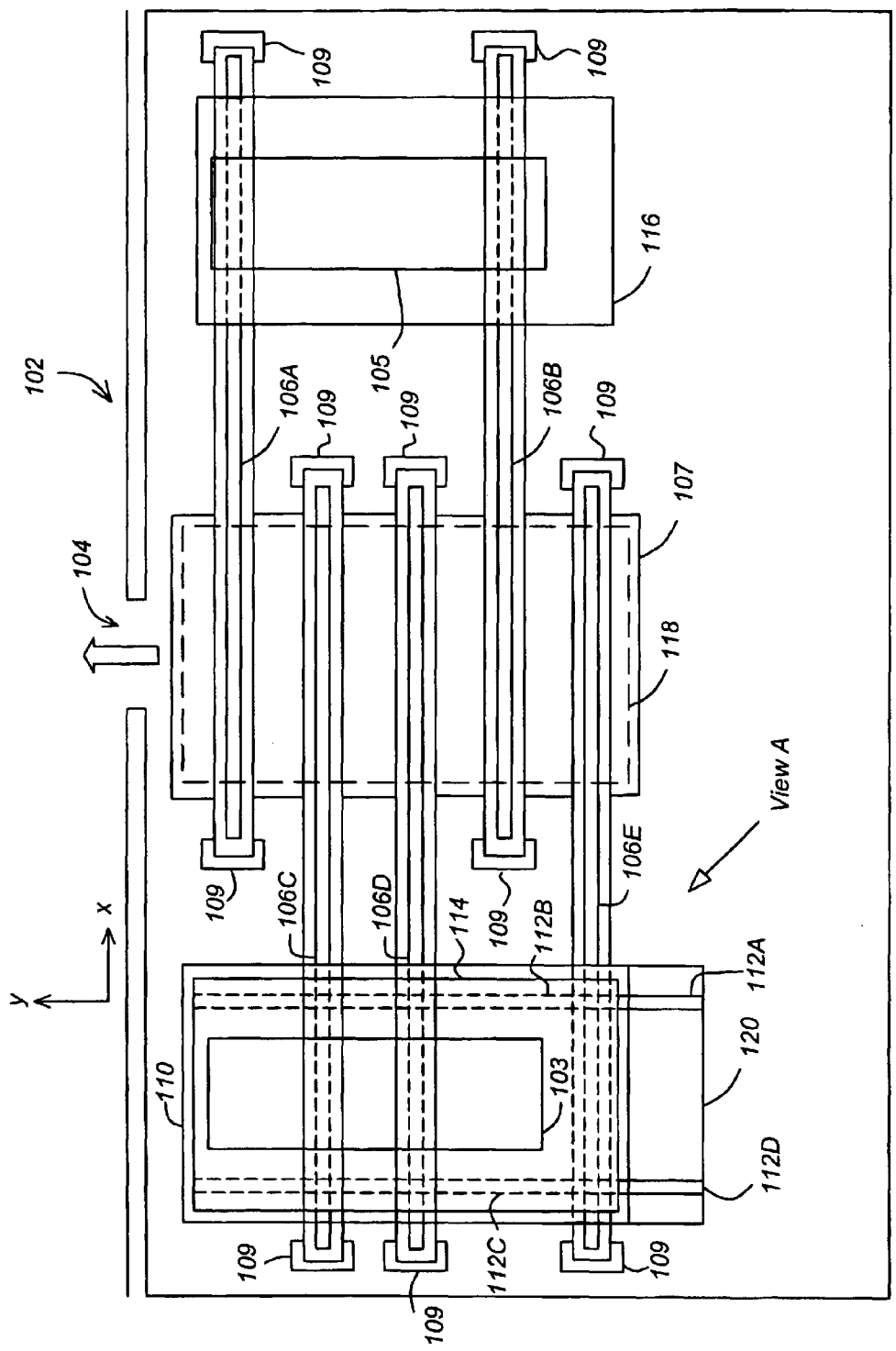
FIG. 1A is a diagram showing a top view of one embodiment of the present invention.

FIG. 1A is a diagram showing a top view of the projection booth 102 with the associated projector positioning equipment installed therein. The projection booth 102 includes an aperture 104 through which projectors 103, 105 selectably project film images on a display screen along the "y" axis as shown.

The projector positioning equipment comprises a first rail system 106, which extends longitudinally along an "x" axis, which is substantially perpendicular to the "y" axis. In illustrate embodiment, the first rail system 106 includes a first rail subsystem 106A-106B, and a second rail subsystem 106C-106E.

The projector positioning equipment further comprises a first platform 110. The first platform 110 is translationally slidable along the "x" axis over at least a portion of the rail system 106. In the illustrated embodiment, the first platform is translationally slidable along the "x" axis on rails 106C-

106E. This is accomplished via a rail interface member, that makes with one or more of the rails of the first rail system 106. Embodiments of the interface between the first platform 110 in the rail system 106 are presented below.

The first platform 110 includes a second rail system 112 comprising second rail portions 112A-112D. In the illustrated embodiment, the second rail system 112 is disposed on top of the first platform 110 on an opposite side of the first platform 110 from the first rail system 106.

A second platform 114 is mounted to the second rail system 112. The second platform 114 is translationally slidable along the second rail system 112 along the "y" axis. The second platform 114 is adapted for mounting a first projector 103 thereto.

A second projector 105 is mounted to a third platform 116. The third platform 116 is translationally slidable along the "x" axis on the first rail system 106.

Using the assembly comprising the first rail system 106, and the first platform 110, the first projector 103 can be moved translationally from the first park position (which is shown) to a display position 118. In the display position 118, the first projector 103 is disposed adjacent the projection aperture 104. Hence, in this position the first projector 103 can display images on the display screen without keystone distortion. After use, the first projector 103 can be moved along the first rail system 106 back to the first park position shown.

Similarly, using the assembly comprising the first rail system 106 and the third platform 116, the second projector 105 can be moved translationally from the second park position (shown) to the display position 118.

If optics are disposed in or near the projection aperture, the first projector 103 and the second projector 105 can share those optics.

Rail supports 109 bear and distribute part of the weight load from the projector positioning equipment, and prevent excessive vibration. Pedestal 107 bears the load of the projector 103, 105 when in the display position 118. The pedestal 107 may, for example, comprise concrete or steel.

Figure 1B:
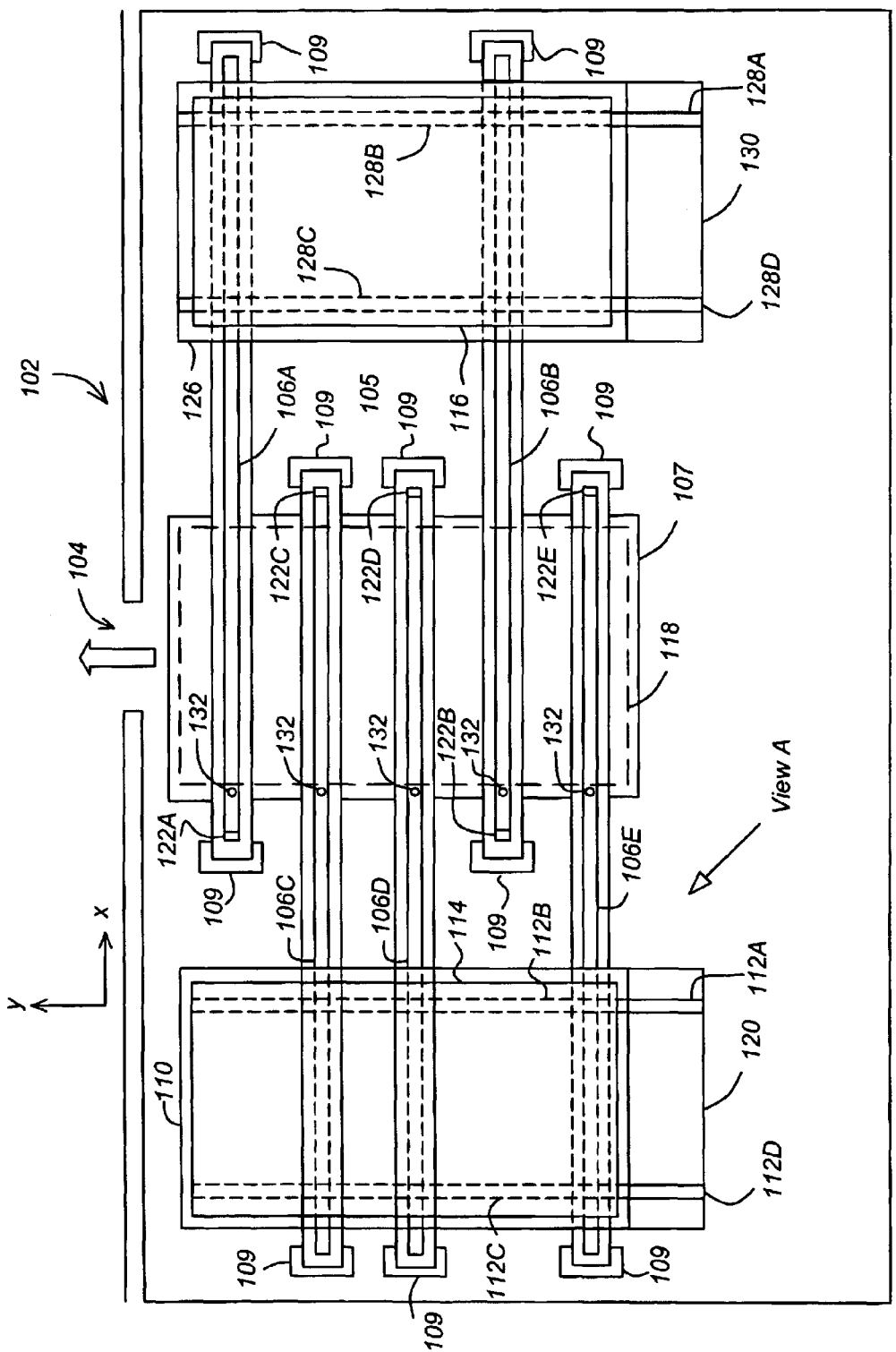
FIG. 1B is a diagram showing a top view of a second embodiment of the present invention.

FIG. 1B is a diagram showing a top view of the second embodiment of the present invention. In this embodiment, the second projector 105 is mounted to the third platform 116 via a fourth platform 126. The fourth platform 126 is translationally slidable along the "x" axis on the first rail system 106 (as illustrated, via rails 106A and 106B). The third platform 116 is therefore translationally slidable along the "x" axis direction as well by way of the fourth platform 126.

Like the first platform 110, the fourth platform 126 includes a rail system 128A-128D upon which the third platform 116 is translationally slidable along the "y" axis.

The first platform 110 may include an extension member 120. In the illustrated embodiment, the extension member is butt coupled to an end of the first platform 110. The extension member 120, includes second rail system 112 extensions 112A and 112D which are disposed adjacent to end: the air with the second rail system 112B and 112C. The second rail system extensions 112A and 112B permit the second platform 114 to slide along the "y" axis away from the projection aperture 104, whether in the deployed position 118 or the park position.

In this embodiment, the first rail system 106 includes a first rail subsystem 106C, 106D, and 106E upon which the first platform 110 is translationally slidable, and a second rail subsystem 106A, 106B upon which the third platform 116 is translationally slidable. Further, the first rail subsystem 106C-106E rail members extend a distance toward the projection aperture 104 sufficient to permit the first platform 110 to be placed in the deployed position 118, while not permitting the first platform (or the first projector 103 disposed upon the first platform 110) to impact or interfere with the third platform 116, the fourth platform 126, or the second projector 105 while in the parked position. The use of a rail subsystem with three rails 106C, 106D, and 106E instead of two permits the first projector 103 to be more massive.

Similarly, the second rail subsystem 106A, 106D includes one or more rail members (two are shown) which extend a distance toward the projection aperture 104 sufficient to permit the third platform 116 to be placed in the deployed position 118, while not permitting the third platform 116, the fourth platform 126, or the second projector 105 to impact or interfere with the first platform 110, the second platform 114, or the first projector 103. Rail stops 122A-122C restrain platforms 110, 126 from excessive translational displacement.

The first rail system 106 may also include one or more guides 132 which mate with the first platform 110 or an appendage extending therefrom, the fourth platform 126 or the third platform 116 to restrain or affix the first platform 110 in the deployed position. In one embodiment, the guides 132 can comprise holes drilled into selected locations of the rail system 106, and the platform includes a rod affixed thereto, which drops into the hole, thereby preventing any further movement.

Figure 2:
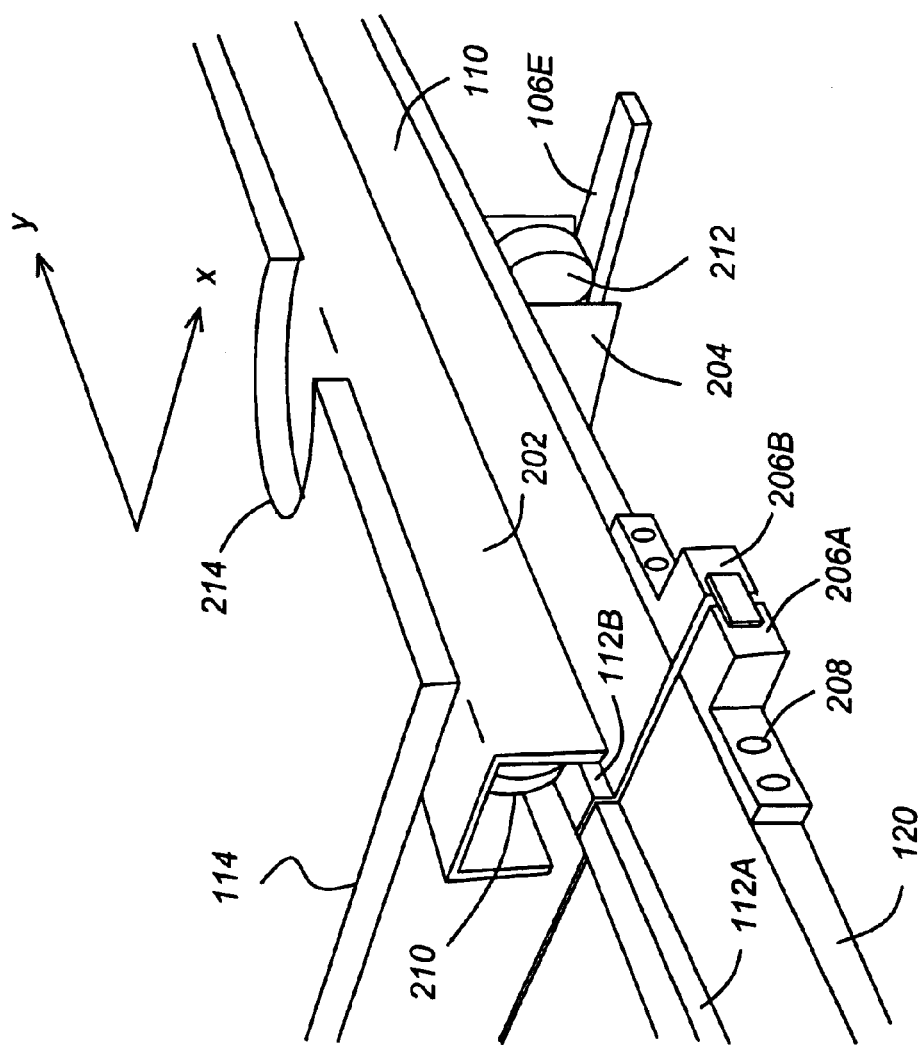
FIG. 2 is a diagram presenting a detailed perspective view of the rail and platform system of the present invention.

FIG. 2 is a diagram showing a perspective view of the rail and platform system of the present invention. The view shown in FIG. 2 is from the "View A" perspective denoted on FIG. 1A. In this embodiment, the rail interface member is a wheel 212, which rotatably engages the rail 106E. Sleeve 204 extends downward from the first platform 110 in the direction of the rail 106E, and prevents movement of the platform 110 along the "y" axis. Similarly, the wheel 210 extends downward from the second platform 114, and rotatably engages the second rail 112B, permitting motion along the "y" axis, while sleeve 212 extends downward from the second platform 114 in the direction of the rail 112B, and prevents movement of the second platform 114 along the "x" axis.

Finally, FIG. 2 also shows a second platform 114 surface feature 214, that is used to affix the projector 103 one the second platform 114.

Platform extension member 120 is illustrated as buttcoupled to the first platform 110 via coupling device 206. The coupling device 206 includes a first portion 206A which is attached to the platform extension member 120 by fasteners 208, and a second portion 206B, which is attached to the first platform 110 by similar fasteners. The coupling device 206 also includes a disconnectable coupler 208, which fasteners the first portion 206A and the second portion 206B together.

Figure 3:
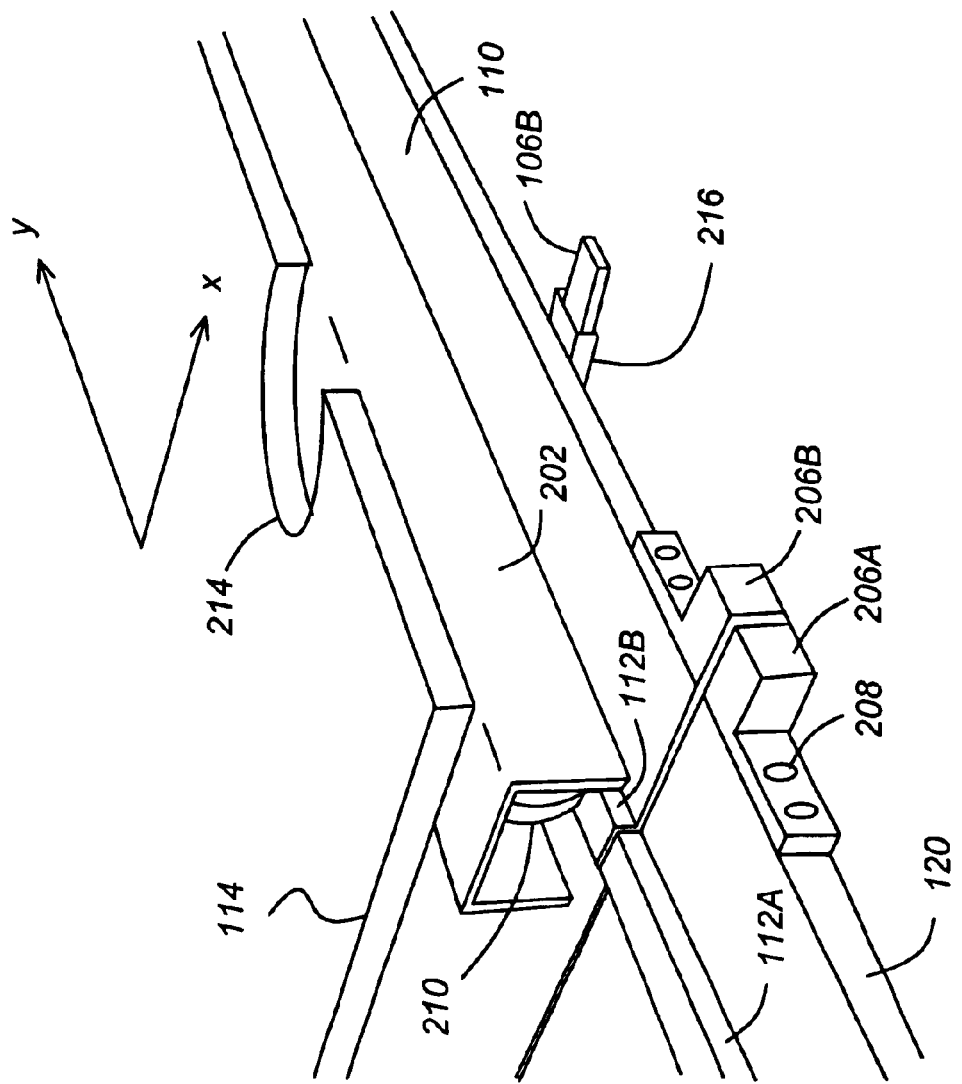
FIG. 3 is a diagram presenting a detailed perspective view of a second embodiment of the rail and platform system of the present invention.

FIG. 3 is a diagram presenting a perspective view of another embodiment of the rail and platform system of the present invention. In this embodiment, the first platform 110 is moved translationally by a sleeve 216, which slidably engages rail 106E. The engagement between the sleeve to 216 and the rail 106E can be facilitated with ball bearings or similar devices for smooth motion. A similar design can be used for the wheel 210 sleeve 202 combination shown in FIG. 3 as well.

Figure 4:
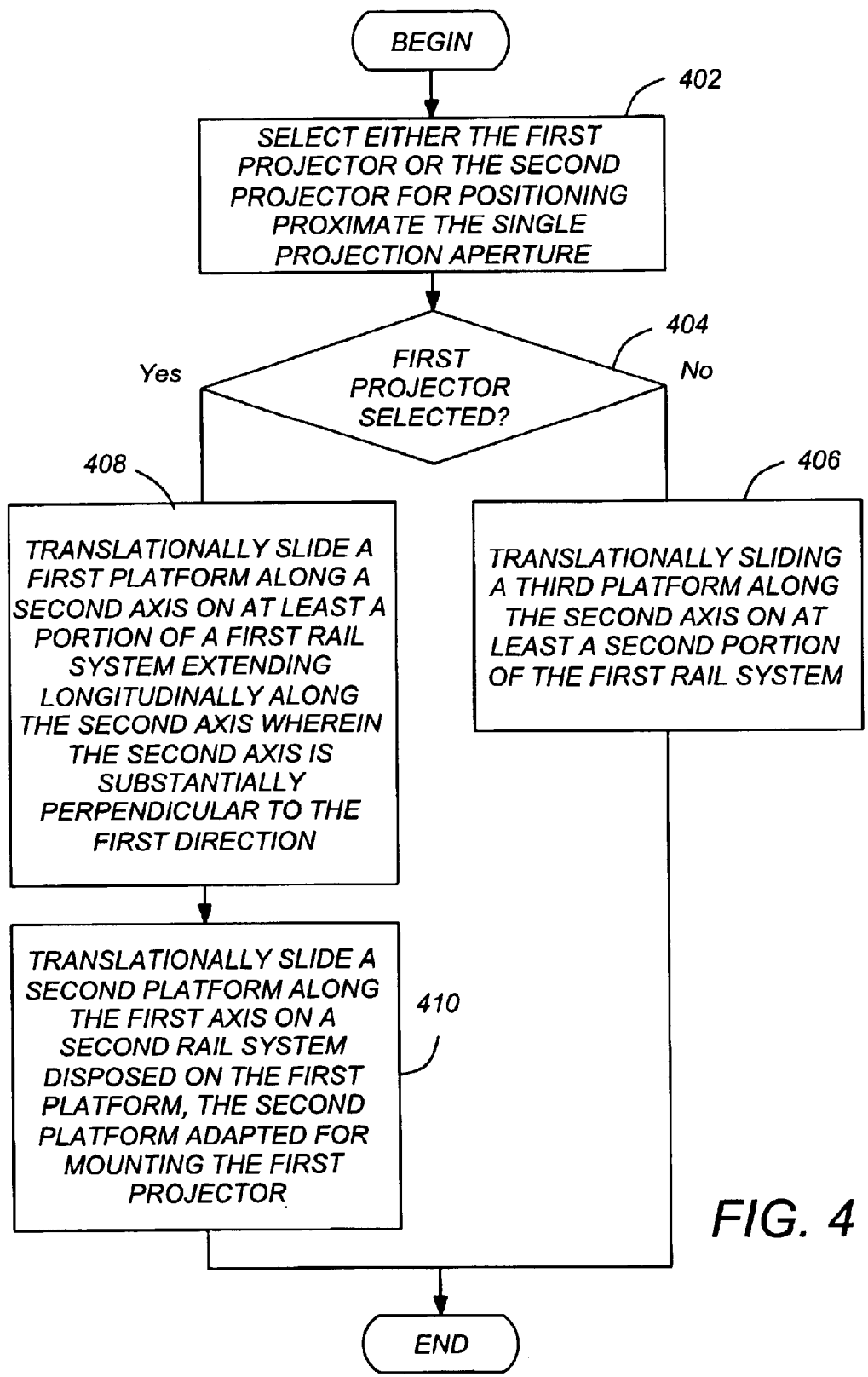
FIG. 4 is a flow chart presenting illustrative process steps that can be used to practice one embodiment of the present invention.

FIG. 4 is a flow chart presenting illustrative process steps that can be used to practice one embodiment of the present invention. Either the first projector 103 or the second projector 105 is selected for positioning proximate the single projection aperture 104. This is shown in block 402. If the second projector 105 is selected, the third platform 116 is translationally slid along the "x" axis on at least a portion of the first rail system 106 to a position proximate the single projection aperture 104, as shown in blocks 402 and 406. If the first projector 103 is selected, the first platform 110 is translationally slid along the "x" axis on at least a portion of the first rail system 106 to the position proximate the single projection aperture 104, as shown in block 402. If desired, the first projector 103 (and in the embodiment shown in FIG. 1B, the second projector 105) can be translationally slid along the "y" axis on the second rail system 112.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for selectively positioning a first projector and a second projector to project an image through a single projection aperture along a first axis, comprising:
   a first rail system, extending longitudinally along a second axis substantially perpendicular to the first axis;
   a first platform, translationally slidable along the second axis on at least a portion of the first rail system;
   a second rail system, disposed on the first platform;
   a second platform, adapted for mounting the first projector and translationally slidable along the first axis on the second rail system; and
   a third platform, adapted for mounting the second projector and translationally slidable along the second axis on at least a portion of the first rail system.

2. The method of claim 1, wherein:
   the second projector is mounted to the third platform via a fourth platform, the fourth platform translationally slidable along the second axis on the first rail system;
   the fourth platform comprises a third rail system; and
   the third platform is translationally slidable along the second axis via the third rail system.

3. The apparatus of claim 1, wherein:
   the first platform is translationally slidable first rail system via at least one first rail interface member, mating with at least one rail of the first rail system.

4. The apparatus of claim 2, wherein the first rail interface member comprises a wheel rotatably engaging a rail of the first rail system.

5. The apparatus of claim 2, wherein the first rail interface member comprises a sleeve member slidably engaging a rail of the first rail system.

6. The apparatus of claim 1, wherein the first platform further comprises a first platform extension member coupled to an end of the first platform, the first platform extension member comprising:
   a second rail system extension disposed adjacent and co-linear with the second rail system.

7. The apparatus of claim 1, wherein the first platform extension member is butt coupled to the end of the first platform.

8. The apparatus of claim 1, wherein the first rail system comprises:
   a first rail subsystem;
   a second rail subsystem; and
   wherein the first platform is translationally slidable along the second axis on the first rail subsystem in the third platform is translationally slidable along the second axis on the second rail subsystem.

9. The apparatus of claim 8, wherein:
   the first platform is translationally slidable between a first park position and a deployed position proximate the projection aperture; and
   the second platform is translationally slidable between a second park position opposite the first park position and the deployed position proximate the projection aperture.

10. The apparatus of claim 9, wherein:
    the first rail subsystem extends from the first park position to the deployed position; and
    a second rail subsystem extends from the second park position to the deployed position to prevent the second projector from translationally sliding along the second axis to the first park position.

11. The apparatus of claim 9, wherein:
    the first rail system includes one or more guides mating with the first platform to affix the first platform in the deployed position, and to affix the first platform in the deployed position.

12. A method of selectively positioning a first projector and a second projector to project an image through a single projection aperture along a first axis, comprising:
    selecting either the first projector or the second projector for positioning proximate the single projection aperture;
    translationally sliding a first platform along a second axis on at least a portion of a first rail system extending longitudinally along the second axis if the first projector is selected, wherein the second axis is substantially perpendicular to the first axis;
    translationally sliding a second platform along the first axis on a second rail system disposed on the first platform, the second platform adapted for mounting the first projector; and
    translationally sliding a third platform along the second axis on at least a second portion of the first rail system if the second projector is selected.

13. The method of claim 12, wherein the first platform is translationally slid from a first park position to a deployed position proximate the projection aperture.

14. The method of claim 13, wherein the third platform is translationally slid from a second park position to the deployed position proximate the projection aperture.

* * * * *